United States Patent [19]

Wykes et al.

[11] Patent Number: 4,562,546
[45] Date of Patent: Dec. 31, 1985

[54] STABILITY AUGMENTATION SYSTEM FOR A FORWARD SWEPT WING AIRCRAFT

[75] Inventors: John H. Wykes, Rolling Hills Estates; Gerald D. Miller, Long Beach, both of Calif.

[73] Assignee: Rockwell International Corporation, El Segundo, Calif.

[21] Appl. No.: 457,618

[22] Filed: Jan. 13, 1983

[51] Int. Cl.$^4$ ............................................. B64C 5/08
[52] U.S. Cl. ................................ 364/434; 244/75 A; 244/191
[58] Field of Search .................... 364/433, 434, 508; 318/584, 585; 244/75 R, 75 A, 76 R, 76 C, 191, 194, 45 R

[56] References Cited

U.S. PATENT DOCUMENTS

| | | | |
|---|---|---|---|
| 2,420,932 | 5/1974 | Cornelius | 244/76 C |
| 3,240,447 | 3/1966 | Olshausen | 244/191 |
| 3,279,725 | 10/1966 | Andrew et al. | 244/191 |
| 3,347,498 | 10/1967 | Priestley et al. | 244/191 |
| 3,412,961 | 11/1968 | Howard | 244/191 |
| 3,734,432 | 5/1973 | Low | 244/191 |
| 3,819,135 | 5/1974 | Foxworthy et al. | 244/177 |
| 3,902,686 | 9/1975 | Wykes et al. | 244/191 |
| 4,171,115 | 10/1979 | Osder | 244/181 |
| 4,417,708 | 11/1983 | Negri | 244/45 R |
| 4,479,620 | 10/1984 | Rogers et al. | 244/75 R |

Primary Examiner—Gary Chin
Attorney, Agent, or Firm—Charles T. Silberberg

[57] ABSTRACT

A stability augmentation system for a forward swept wing aircraft is disclosed that corrects a dynamic instability phenomenon which occurs when the whole vehicle (rigid body) motion couples with the wing structural motion. The sensors are positioned and their output signals combined such that wing structural motion is isolated. Specifically positioned wing control surfaces are operated to suppress such motion with minimal resulting rigid body pitch motion inducing inputs.

14 Claims, 3 Drawing Figures

STABILITY AUGMENTATION SYSTEM FOR A FORWARD SWEPT WING AIRCRAFT

BACKGROUND OF THE INVENTION

1. Field of the Invention

This invention relates to an aerodynamic control system for structural stability augmentation of a forward swept wing aircraft.

2. Statement of Prior Art

Forward swept wings of metal are limited in their use due to the static stability phenomenon of divergence at high speed flight conditions. Making the wing out of composite materials offers relief from this phenomenon. However, forward swept wings made from composites are still quite flexible when installed on aircraft. This has led to the observation of a newly discovered dynamic stability phenomenon called rigid body (whole vehicle) structural mode coupling. This occurs as a result of coupling between properly phased wing bending and the aircraft rigid body pitching mode when the frequencies of the two modes are close together. The consequences of rigid body structural mode coupling (also known as rigid body/wing bending flutter) are structural dynamic instability that can be critical with certain aircraft configurations, a degradation in aircraft handling and ride qualities, and increased wing design loads for gusts.

Stability augmentation systems for augmenting whole vehicle motion response are well known in the art. One such system is disclosed in U.S. Pat. No. 4,171,115 to Osder. Another such system is disclosed in U.S. Pat. No. 3,819,135 to Foxworthy, et al. An application of such a system to a forward swept wing aircraft is disclosed in U.S. Pat. No. 2,420,932 to Cornelius.

Augmentation systems have also been used on flexible aircraft to control structural motion and provide stability. Examples of such systems are disclosed in U.S. Pat. Nos. 3,412,961 and 3,279,725. U.S. Pat. No. 3,902,686 discloses a structural mode control system having sensing elements to operate control force application devices such as aerodynamic control vanes to obtain structural damping. Sensing elements are located near control force application points. In U.S. Pat. No. 3,347,498, a system is disclosed which utilizes accelerometers employed on the wing and fuselage to sense structural accelerations of the wing and to operate wing control surfaces to reduce wing structural stress. Rigid body motion and structural motion are separated by appropriate placement of sensors. A flutter suppression system is disclosed in U.S. Pat. No. 3,734,432. Here one or more pairs of leading and trailing edge control surfaces are operated by a stability augmentation system to suppress flutter. De-stabilizing effects on the rigid body mode are opposed by additional leading and trailing edge control pairs on the horizonal tail or canard.

While the invention will be described in connection with the preferred embodiments, it will be understood that it is not intended to limit the invention to those embodiments. On the contrary, it is intended to cover all alternatives, modifications, and equivalents which may be included within the spirit and scope of the invention as defined by the appended claims.

SUMMARY OF THE INVENTION

It is, therefore, an object of the present invention to provide a stability augmentation system for a forward swept wing aircraft which suppresses wing flexure and rigid body/wing bending flutter with minimal resulting rigid body motion inducing inputs.

It is another object of this invention to provide a stability augmentation system for a forward swept wing aircraft that improves vehicle handling qualities.

It is yet another object of the present invention to provide a stability augmentation system for a forward swept wing aircraft which improves ride qualities.

It is still another object of the present invention to provide a stability augmentation system for a forward swept wing aircraft that reduces wing design structural loads for gusts and turbulence.

Briefly, in accordance with the invention, there is provided a stability augmentation system for a forward swept wing aircraft that uses active controls to suppress rigid body/wing bending flutter and wing flexure. Flight control surfaces are mounted on each wing in a position to straddle an axis substantially perpendicular to the fuselage center line and which passes through the aircraft's nominal center of gravity. Wing sensors are mounted near each of the control surfaces to provide signals indicative of wing motion. Sensors are also mounted on the fuselage to provide signals indicative of fuselage motion. A computer means is responsive to the signals from the sensors to generate control signals indicative of wing structural motion. A control means receives the control signals and moves the control surfaces proportional to the control signals such that wing flexure and rigid body/wing bending flutter are suppressed. The control surfaces can be operated differentially to compensate for asymmetric wing structural motion.

Other objects and advantages of the invention will be apparent upon reading the following detailed description and upon reference to the drawings.

DETAILED DESCRIPTION OF THE INVENTION

Figure 1:
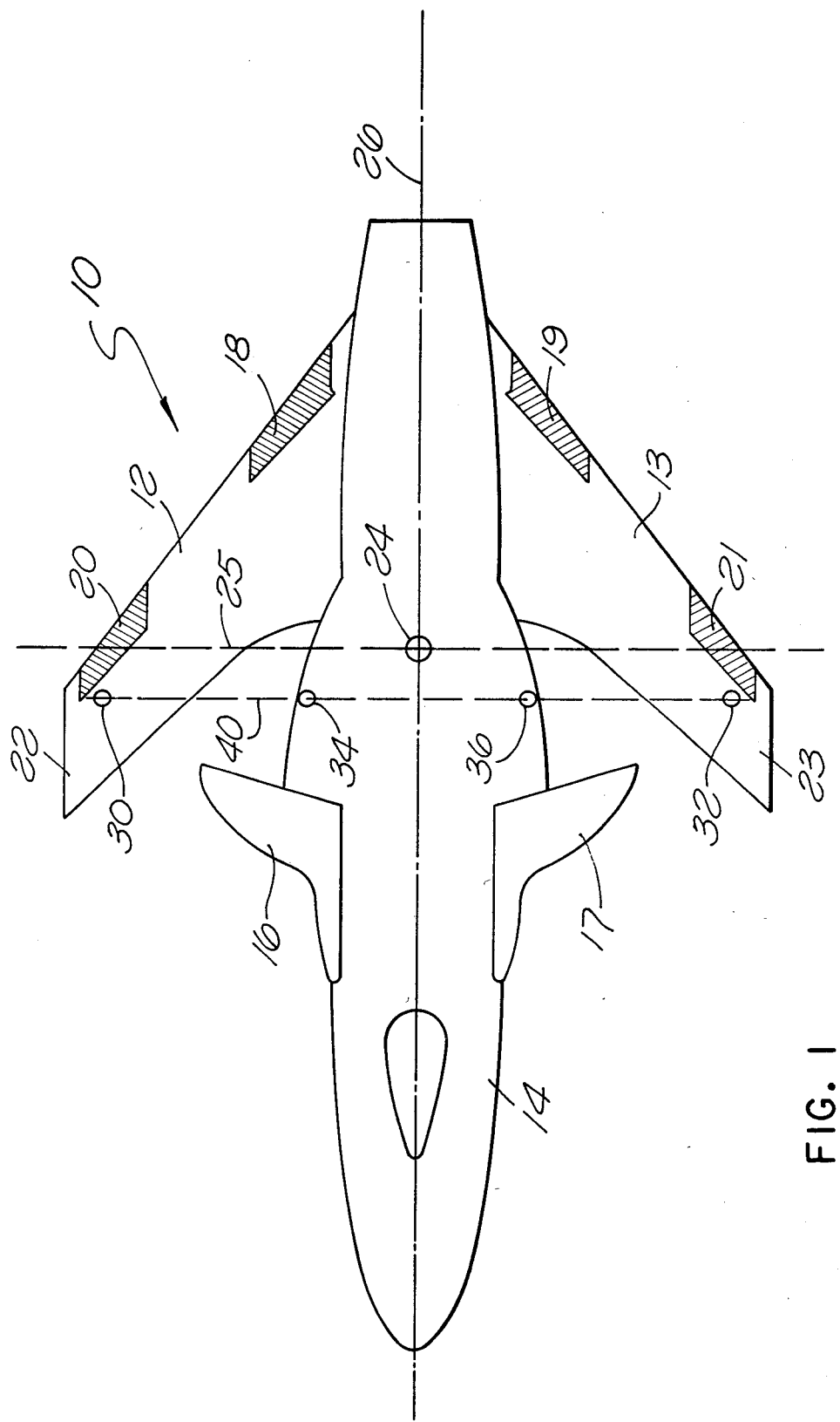
FIG. 1 is a top plan view of a forward swept wing aircraft equipped with the stability augmentation system.

Referring now to FIG. 1, there is shown an aircraft generally indicated at 10 having forward swept wings 12 and 13, and fuselage 14. Wing 12 is on the right or starboard side of the aircraft while wing 13 is on the left or port side of the aircraft. Aircraft 10 will normally employ canard surfaces 16 and 17. Positioned on wing 12 along the trailing edge are moveable flight control surfaces 18 and 20. Similarly, positioned on wing 13 along the trailing edge thereof are moveable flight control surfaces 19 and 21. In accordance with the present invention, control surfaces 18 and 19 function as elevons while control surfaces 20 and 21 act as ailerons and as a means to suppress wing flexure and rigid body/wing bending flutter.

Control surfaces 20 and 21 are optimally located at or near the wing tips 22 and 23 respectively. The purpose is two-fold. First, on a forward swept wing aircraft, outboard control surface effectiveness increases with dynamic pressure (which is opposite to the loss of effectiveness on aft swept wings). This is significant since rigid body/wing bending flutter on typical forward swept wing aircraft occurs with increasing speed (and dynamic pressure). As such, control surface deflection is more effective and produces a more rapid response. Secondly, by virtue of the geometry of forward swept wing aircraft, control surfaces near the wing tip will normally straddle the nominal aircraft center of gravity indicated at 24. This is shown in FIG. 1 by an axis indicated at 25 which is perpendicular to the fuselage center line 26 and which passes through the aircraft's center of gravity 24 and control surfaces 20 and 21. As such, when surfaces 20 and 21 are deflected to suppress rigid body/wing bending flutter in accordance with the present invention, there will be substantially no resulting rigid body pitch motion inducing input. Therefore, compromise of handling qualities is minimized.

While the control surfaces 20 and 21 are illustrated to be positioned on the trailing edge of the wings 12 and 13, they could also be positioned on the leading edge of the wings and serve the same purposes in accordance with the present invention if aircraft geometry was such that they straddled the aircraft's nominal center of gravity 24. The term "nominal" is used since during flight, the aircraft's actual center of gravity will shift, i.e., due to fuel usage. Accordingly, what is meant by the term "nominal" is the average location of the center of gravity during flight.

Sensor 30 is positioned on wing 12 near control surface 20, i.e., at approximately the control force application point. This principal is described in U.S. Pat. No. 3,902,686. Likewise, sensor 32 is positioned on wing 13 near control surface 21. Sensors 34 and 36 are positioned on the right and left side of the fuselage respectively. Optimally, sensors 30, 32, 34, and 36 will all lie substantially in a plane indicated at 40 perpendicular to the fuselage center line 26.

Sensors 30, 32, 34, and 36 are preferably linear accelerometers which are positioned to measure vertical acceleration. Thus, sensor 30 measures vertical acceleration of wing 12, sensor 32 measures vertical acceleration of wing 13, and sensors 34 and 36 measure vertical fuselage acceleration.

Figure 2:
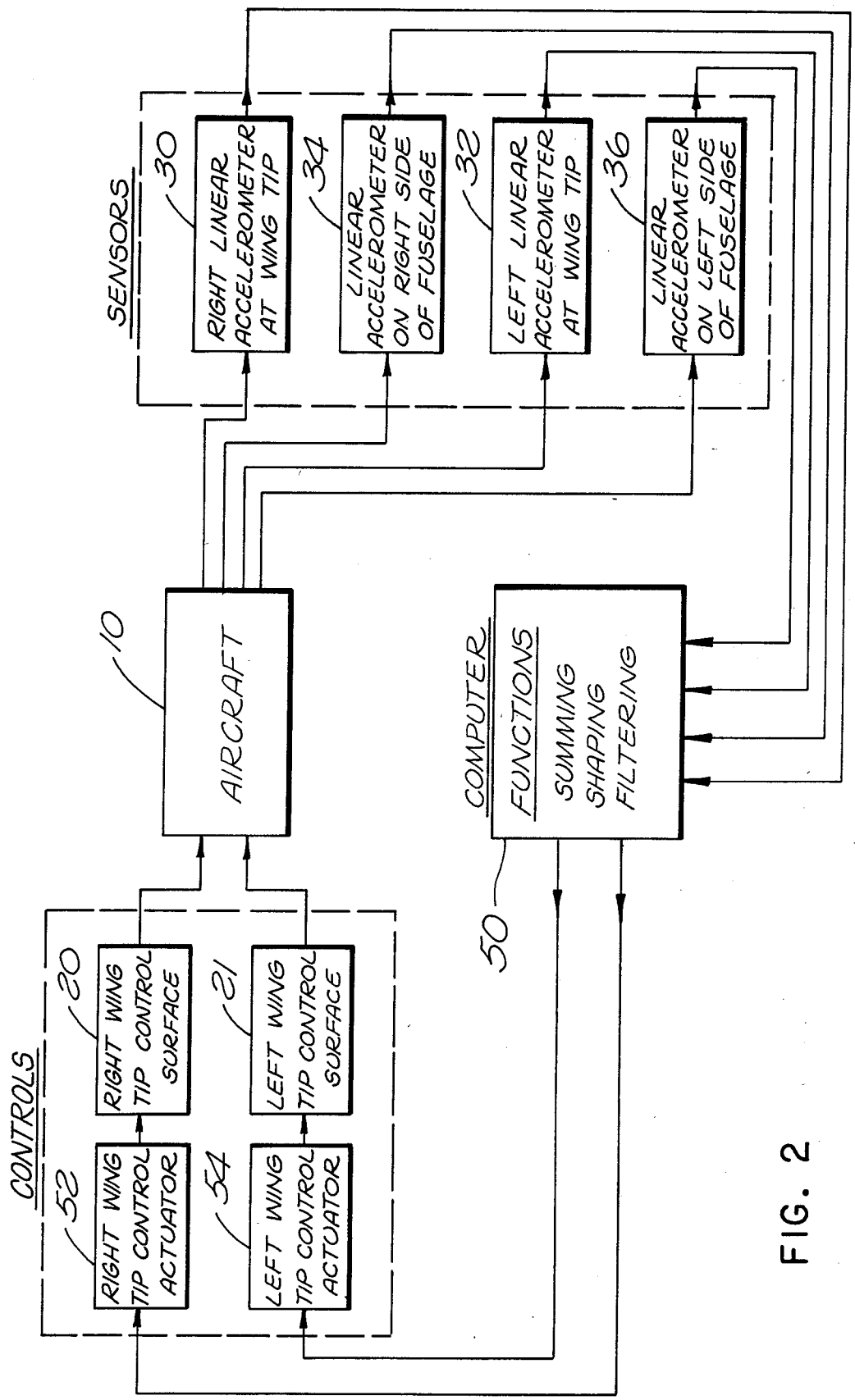
FIG. 2 is a block diagram illustrating the stability augmentation system.

Turning now to FIG. 2, there is shown a block diagram of the present stability augmentation system. In response to an upset excitation, such as a gust, on aircraft 10, sensors 30 and 32 produce signals proportional to movement of wings 12 and 13 respectively. From the same upset excitation on aircraft 10, the sensors 34 and 36 on the fuselage also produce signals. These signals are however indicative of fuselage motion.

The signals from sensors 30, 32, 34, and 36 are transmitted to a computer 50. The signals are combined (subtracted) in the computer 50 to compute the wing structural motion, i.e., the difference between the vertical wing acceleration and the vertical fuselage acceleration. In the symmetric case, wing structural motion of wings 12 and 13 is equal. In the asymmetric case, wing structural motion of the wings is unequal. In order to correctly address each of there conditions, the computer 50 combines the signals from sensors 32 and 36 to obtain the structural motion of wing 13 and combines the signals from sensors 30 and 34 to obtain the structural motion of wing 12. Signals representative of structural motion for each wing are generated which are shaped and filtered to produce correct phasing and gain adjustments.

Computer 50 transmits a control signal representative of structural motion of wing 12 to an actuator 52. Computer 50 also transmits a second control signal indicative of structural motion of wing 13 to actuator 54. Actuator 52 rotates control surface 20 proportional to the control signal it receives. Similarly, actuator 54 rotates control surface 21 in proportion to the control signal it receives from computer 50. In the symmetric case, control surfaces 20 and 21 are rotated equally. In the asymmetric case, control surfaces 20 and 21 would be rotated differentially. The rotation of surfaces 20 and 21 in accordance with the respective control signals from computer 50 is such as to oppose or suppress wing flexure and consequently rigid body/wing bending flutter which may otherwise occur, i.e., by damping out the oscillations due to wing structural motion and thereby avoiding the destabilizing effects of its combination with rigid body oscillation.

In the view of the above, it should be understood that the present system compensates for aircraft roll movements. Thus, vertical acceleration as computed by respective wing and fuselage sensor pairs, e.g., 32 and 36, will be varied by an equal amount due to the roll movement. As such, the relative motion (of wing verses fuselage) as determined by the respective pairs of fuselage and wing sensors will be unaffected by an aircraft roll movement.

Figure 3:
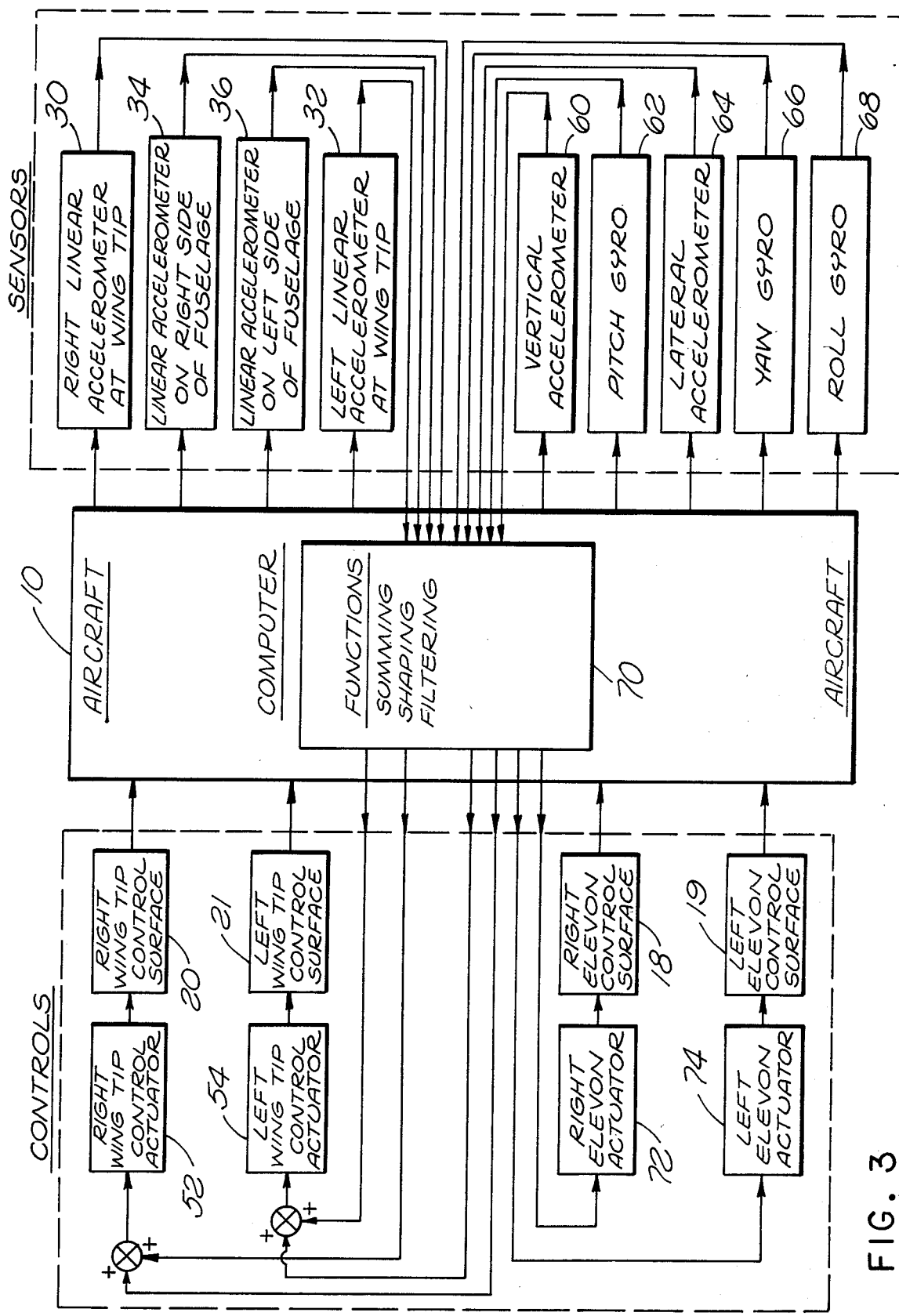
FIG. 3 is a block diagram of the stability augmentation system incorporated with a whole vehicle stability augmentation system.

While the present stability augmentation system can be a stand-alone system, it is optimally employed as an addition or enhancement to a basic (primary) stability augmentation system which is concerned with whole vehicle stability. A combined system is illustrated in FIG. 3. It has been determined that primary system control surface movement requirements are reduced as a result of the enhancement, thereby reducing power requirements. With the primary system, a number of sensors to determine change in attitude of the aircraft are employed. Such sensors would be positioned in suitable places on aircraft 10. Typically included would be a vertical accelerometer 60, a pitch gyro 62, a lateral accelerometer 64, a yaw gyro 66, and a roll gyro 68. These sensors transmit signals to a computer 70. These signals are combined, shaped, and filtered in the computer to generate attitude control signals. The attitude signals are transmitted to actuators 72 and 74 to rotate elevons 18 and 19 respectively as appropriate to stabilize the aircraft in the pitch mode and to actuators 52 and 54 to rotate control surfaces 20 and 21 to stabilize the aircraft in the roll mode. The other sensors and controls illustrated in FIG. 3 work as described previously with respect to FIG. 2 (with computer 70 also performing the same functions as computer 50). As control surfaces 20 and 21 are utilized for both roll control and rigid body/wing bending flutter suppression, the attitude control signals which are transmitted from computer 70 to actuators 52 and 54 are combined with the respective flutter control signals from computer 70 to actuators 52 and 54.

While the present invention solves the problem of rigid body/wing bending flutter on forward swept wing aircraft, it has been discovered that there are additional important benefits. The impact of wing flexibility on a forward swept wing aircraft is such that the static lifting capability at a given attitude to the wind will be greatly increased, e.g., by a factor of 1.5 over a rigid wing, whereas on an aft swept wing at the same flight conditions wing lifting capabilities are greatly reduced, e.g., to a factor of about 0.6 over a rigid wing. This increased wing lift capability and wing flexibility on a forward swept wing causes an oscillation of the whole aircraft motion when upset by turbulence or rapid pilot control motion. At higher speeds, the wing oscillation frequency is usually at the resonant frequency of the rigid body motion. Thus, the handling qualities of the aircraft are compromised. Similarly, the same wing oscillation motion is transmitted to the crew station causing adverse ride quality. Further, the large wing motion under turbulence with its increased lifting effectiveness can cause increased wing design loads. Accordingly, by suppressing wing flexure and rigid body/wing bending flutter, the present invention also makes improvements in the related areas of ride quality, handling qualities, and wing design loads.

Thus it is apparent that there has been provided, in accordance with the invention, a stability augmentation system for a forward swept wing aircraft that fully satisfies the objectives, aims, and advantages set forth above. While the invention has been described in conjunction with specific embodiments thereof, it is evident that many alternatives, modifications, and variations will be apparent in light of foregoing description. Accordingly, it is intended to embrace all such alternatives, modifications, and variations that fall within the spirit and scope of the appended claims.

What is claimed is:

1. A system for augmenting stability of an aircraft having a fuselage and forward swept wings comprising:
    a control surface mounted on each wing, said control surfaces positioned such that a plane substantially perpendicular to the fuselage center line and which passes through the nominal aircraft center of gravity also passes through said control surfaces;
    wing sensors mounted near each of said control surfaces for providing first signals indicative of the motion of each wing;
    fuselage sensor means mounted on the fuselage for providing second signals indicative of fuselage motion;
    computer means responsive to said first and second signals to generate control signals indicative of wing structural motion; and
    control means receiving said control signals for moving said control surfaces proportional to said control signals such that wing flexure and rigid body/wing bending flutter are suppressed with minimal resulting rigid body pitch motion inducing inputs.

2. The system of claim 1 where said control surfaces are positioned adjacent to the wing tips.

3. The system of claim 2 wherein said control surfaces are positioned along the trailing edge of the wings.

4. The system of claim 2 wherein said control surfaces are positioned along the leading edge of the wings.

5. The system of claim 2 wherein the wing sensors and fuselage sensor means lie substantially in a plane perpendicular to the fuselage center line.

6. The system of claim 5 wherein said wing sensors and said fuselage sensor means measure vertical acceleration.

7. The system of claim 5 also including:
    attitude sensing means for providing signals of change in aircraft attitude, said computer means being responsive to said signals from said attitude sensing menas to generate second and third control signals;
    an elevon mounted on each wing inboard of said control surfaces;
    second control means responsive to said second control signals for moving said elevons proportional to said second control signals for augmenting aircraft stability, and
    wherein said control means in responsive to said third control signals to move said control surfaces for augmenting aircraft stability.

8. The system of claim 5 wherein said control means moves said control surfaces equally.

9. The system of claim 5 wherein said control means moves said control surfaces differentially to compensate for asymmetric wing structural motion 10. The system of claim 5 wherein said computer means combines said signals from said fuselage sensor means and said wing sensors to isolate the structural motion of each wing and generate respective control signals indicative thereof, and said control means moves each control surface proportional to corresponding control signals.

11. The system of claim 10 wherein said fuselage sensor means comprises sensors mounted on opposite sides of the fuselage and said computer means combines signals from said wing sensors and said fuselage sensors on the same side of the fuselage to generate respective control signals indicative of wing structural motion for each wing.

12. The system of claim 10 wherein said computer means compensates for aircraft roll acceleration in generating said control signals.

13. The system of claim 1 wherein an axis which lies within said plane passes through the nominal aircraft center of gravity and said control surfaces.

14. The system of claim 1 wherein said plane is perpendicular to the fuselage center line.

* * * * *